US008560601B2

(12) United States Patent  (10) Patent No.: US 8,560,601 B2
Clavel  (45) Date of Patent: *Oct. 15, 2013

(54) SERVER METHOD AND SYSTEM FOR EXECUTING APPLICATIONS ON A WIRELESS DEVICE

(75) Inventor: Philippe Clavel, La Jolla, CA (US)

(73) Assignee: Phunware, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/440,240

(22) Filed: Apr. 5, 2012

(65) Prior Publication Data

US 2012/0239735 A1  Sep. 20, 2012

Related U.S. Application Data

(63) Continuation of application No. 12/098,670, filed on Apr. 7, 2008, now Pat. No. 8,271,579.

(51) Int. Cl.
*G06F 15/16* (2006.01)

(52) U.S. Cl.
USPC .......................................................... 709/203

(58) Field of Classification Search
USPC ................................................. 709/203, 230
See application file for complete search history.

(56) References Cited

U.S. PATENT DOCUMENTS

| | | | |
|---|---|---|---|
| 5,060,140 A | 10/1991 | Brown et al. | |
| 5,625,775 A | 4/1997 | Davis et al. | |
| 6,345,279 B1 | 2/2002 | Li et al. | |
| 6,795,710 B1 | 9/2004 | Creemer | |
| 6,884,172 B1 | 4/2005 | Lloyd et al. | |
| 6,996,537 B2 | 2/2006 | Minear et al. | |
| 7,222,154 B2 | 5/2007 | Dowling | |
| 7,506,070 B2 | 3/2009 | Tran et al. | |
| 7,580,703 B1 | 8/2009 | Veselov et al. | |
| 7,599,665 B2 | 10/2009 | Sinivaara | |
| 7,636,792 B1 | 12/2009 | Ho | |

(Continued)

FOREIGN PATENT DOCUMENTS

| | | |
|---|---|---|
| EP | 1571547 A1 | 9/2005 |
| KR | 20070003418 A | 1/2007 |
| KR | 20080022697 A | 3/2008 |
| WO | WO 02/103963 A1 | 12/2002 |

OTHER PUBLICATIONS

Final Office Action mailed Jun. 29, 2010 for U.S. Appl. No. 12/098,670, filed Apr. 7, 2008.

(Continued)

*Primary Examiner* — Jason Recek
(74) *Attorney, Agent, or Firm* — Wilson Sonsini Goodrich & Rosati (57) ABSTRACT

A server implemented method for facilitating execution of an application for a wireless device. The server selects a plurality of scene components, which comprise at least one functional unit operable to execute functions associated with the scene components. The functional units may be a portion of an application operable to be executed by the wireless device. The server selects a plurality of assets, which may be used in rendering a scene utilizing the plurality of scene components. The server determines a partition of functionality of the application which defines a server behavior module for executing on the server and a client behavior module for executing on the wireless device. The server customizes the plurality of scene components and the plurality of assets for the wireless device, which are then sent to the wireless device for execution and rendering.

18 Claims, 6 Drawing Sheets

(56) References Cited

U.S. PATENT DOCUMENTS

| | | |
|---|---|---|
| 2002/0018487 A1 | 2/2002 | Chen et al. |
| 2002/0103881 A1 | 8/2002 | Granade et al. |
| 2002/0109718 A1 | 8/2002 | Mansour et al. |
| 2003/0018521 A1 | 1/2003 | Kraft et al. |
| 2003/0106022 A1 | 6/2003 | Goodacre et al. |
| 2003/0120637 A1 | 6/2003 | Chithambaram et al. |
| 2003/0182419 A1 | 9/2003 | Barr et al. |
| 2004/0181779 A1* | 9/2004 | Gorti ............................ 717/120 |
| 2004/0205620 A1 | 10/2004 | Nishikiori et al. |
| 2004/0210907 A1 | 10/2004 | Lau et al. |
| 2004/0236860 A1 | 11/2004 | Logston et al. |
| 2004/0252197 A1 | 12/2004 | Fraley et al. |
| 2005/0114862 A1* | 5/2005 | Bisdikian et al. ............ 718/105 |
| 2005/0223352 A1 | 10/2005 | Nishida |
| 2006/0031387 A1 | 2/2006 | Hamzeh et al. |
| 2006/0236308 A1 | 10/2006 | Lamb et al. |
| 2006/0244727 A1 | 11/2006 | Salman et al. |
| 2007/0067373 A1 | 3/2007 | Higgins et al. |
| 2007/0078009 A1 | 4/2007 | Lockton et al. |
| 2007/0123229 A1 | 5/2007 | Pousti |
| 2007/0130156 A1 | 6/2007 | Tenhunen et al. |
| 2007/0130333 A1 | 6/2007 | Bhalla et al. |
| 2007/0155506 A1 | 7/2007 | Malik |
| 2008/0016176 A1 | 1/2008 | Leitner |
| 2008/0140690 A1 | 6/2008 | Cuomo et al. |
| 2009/0037329 A1 | 2/2009 | Coppinger et al. |
| 2009/0037391 A1 | 2/2009 | Agrawal et al. |
| 2009/0177663 A1 | 7/2009 | Hulaj et al. |
| 2009/0220068 A1 | 9/2009 | Vialle et al. |
| 2009/0227274 A1 | 9/2009 | Adler et al. |
| 2009/0251488 A1 | 10/2009 | Clavel |
| 2009/0254605 A1 | 10/2009 | Clavel |
| 2009/0259940 A1 | 10/2009 | Moraes |

OTHER PUBLICATIONS

Grundy, John et al.: "An Architecture for Building Multi-device Thin-Client Web User Interfaces" Advanced Information Systems Engineering, vol. 2348/2002, I (Jan. 1, 2002), pp. 728-732, XP002511217.

International search report and written opinion dated Oct. 6, 2009 for PCT/US2009/001514.

International search report and written opinion dated Oct. 6, 2009 for PCT/US2009/001516.

Mir Farooz Ali et al.; Building Multi-Platform User Interfaces with 1.11M L Internet Citation, [online] XP002280476 Retrieved from the internet: URL: http://arxiv.org/ftp/cs/papers/01 I 1/0111024.pdt> [Retrieved on May 17, 2004].

Office Action mailed Aug. 19, 2010 for U.S. Appl. No. 11/977,319, filed Oct. 23, 2007.

Office Action mailed Dec. 3, 2008 for U.S. Appl. No. 11/977,186, filed Oct. 23, 2007.

Office Action mailed Feb. 16, 2010 for U.S. Appl. No. 11/977,186, filed Oct. 23, 2007.

Office Action mailed Jul. 30, 2010 for U.S. Appl. No. 11/977,229, filed Oct. 23, 2007.

Office Action mailed Jul. 9, 2010 for U.S. Appl. No. 11/977,186, filed Oct. 23, 2007.

Office Action mailed Jun. 25, 2010 for U.S. Appl. No. 11/888,799, filed Aug. 1, 2007.

Office Action mailed Sep. 17, 2009 for U.S. Appl. No. 11/977,212, filed Oct. 23, 2007.

Office Action mailed Sep. 2, 2009 for U.S. Appl. No. 11/977,186, filed Oct. 23, 2007.

Simon, Rainer et al: "Tool-Supported Single Authority for Device Independence and Multimodality" Proceedings of the 7th International Conference on Human Computer Interaction with Mobile Devices & Services, [Online] Sep. 19, 2005, Sep. 22, 2005 pp. 91-98, XP002511216 Retrieved from the interneet: URL: httpllportal.acm.org/citation.cfm?id=1085777.1085793>[Retrieved on Jan. 19, 2009].

Thomas Ziegert et al: "Device Independent Web Applications—The Author Once-Display Everywhere Approach" Web Engineering [Lecture Notes in Computer Science, LNCS], Springer-Verlag, Berline/Heidelberg. vol. 3140, Jul. 7, 2004, pp. 244-255, XP019009074.

VanderDonckt, Jean et al: "Synchronised Model-Based Design of Multiple User Interfaces" Internet Article, [online] Sep. 10, 2004, pp. 1-8, XP002511215 Retrieved from the Internet: URL: http://web.archieve.org/web/20040910043454/http://www.isys.uchica.bekbh/inembers/gli/put/Vanderdonckt¬ IHM2001.pdf> [retrieved on Jan. 20, 2009.

Written Opinion mailed Feb. 1, 2010 for International PCT Application No. PCT/US2008/009302, 8 pgs.

Written Opinion mailed Feb. 1, 2010 for International PCT Application No. PCT/US2008/009303, 8 pgs.

Office action dated Jan. 7, 2010 for U.S. Appl. No. 12/098,670.

Office action dated Mar. 29, 2011 for U.S. Appl. No. 12/098,595.

Office action dated Jun. 29, 2010 for U.S. Appl. No. 12/098,670.

Office action dated Oct. 5, 2011 for U.S. Appl. No. 12/098,670.

Office action dated Nov. 28, 2011 for U.S. Appl. No. 12/098,595.

* cited by examiner

SERVER METHOD AND SYSTEM FOR EXECUTING APPLICATIONS ON A WIRELESS DEVICE

CROSS REFERENCE

This application is a continuation of U.S. patent application Ser. No. 12/098,670, filed on Apr. 7, 2008 now U.S. Pat. No. 8,271,579 which is incorporated herein by reference in its entirety and to which application we claim priority under 35 USC §120.

TECHNICAL FIELD

Embodiments of the present invention relate to the field of wireless communication systems. More particularly, embodiments of the present invention relate to a method and system for executing applications on a wireless device.

BACKGROUND ART

The widespread use and increase in popularity of wireless devices have led to an increase in the number of wireless device types in the world. For example, the use of cellular phones, personal digital assistants (PDAs), PalmPilots, BlackBerrys, laptops, IPods, etc., have become prevalent in the market. The increase in the number of wireless devices has also increased the demand for various applications to run on various wireless devices.

The market is fractured among many manufacturers with different types of wireless devices including brands, models, generations, etc. For example, each year new manufacturers enter the market and existing manufacturers provide new models and new versions for existing wireless devices. Each wireless device is unique based on its brand, model, rendering capability, battery life, processing power, display resolution, color capability, display size, etc., collectively known as wireless device attributes.

Unfortunately, since each wireless device is unique, each application must be tailored in accordance with the wireless device attributes to fully utilize the capabilities of the wireless device. For example, to utilize the entire display of the wireless device, the application must be tailored to render the application in accordance with the display size and resolution of the wireless device. Further, various wireless devices each have various processing and graphics display capabilities. For example, newer wireless devices may have more advanced and capable processing units and customizing applications to make use of these additional capabilities requires tailoring the application.

The increase in the number of applications, the types of wireless devices and the need to tailor each application to a given wireless device type has increased the cost of developing applications. With ever increasing number of models and brands of wireless devices, the number of applications and application versions required to accommodate all of these different wireless devices has increased as well. Since each application must be specific to a given wireless device type with a given brand and model, applications are substantially developed from the ground up for each wireless device type, which increases the cost of developing the application.

Moreover, the increase in cost of developing applications due to the need to tailor each application to all the specific brands and models of wireless devices has hindered and limited the number of titles that a software vendor can produce annually. Software developers simply do not have the time or the resources to take even a single application through a customized quality assurance and debugging process, much less each application for each type of wireless device, thereby limiting the number of titles that a software vendor can produce.

Also, the task of producing all the required versions of a title is not only time consuming and laborious but it also tends to limit upgrades and patches to existing titles. Developers or application vendors need to enter the costly process of submitting the patch or upgrade to reenter quality assurance to a service provider or carrier. In general, a wireless device runs the application locally and renders the result. Thus, updating applications requires a patch/update to be specially developed for and provided to each wireless device individually. For example, updating/patching an application may require the wireless device user to access the application provider's website via the wireless device and to navigate through multiple pages in order to determine whether an update is ready. When an update is ready, the user is required to actively initiate the update process. As a result, many users may not update their applications due to this laborious process.

Prior approaches have dealt with the limited and various capabilities of wireless devices with a client application which off loads the processing to a more powerful server. Often, the wireless device runs a generic client which relies on the server to provide substantially all functionality. As a result, the wireless device is used largely for rendering. Such approaches have limits in providing real-time and interactivity to users such as when resources are needed immediately from the server. For example, real time display of information such as dynamic menus may require waiting for the server to respond.

Thus, a need has arisen to enable applications to provide a rich user experience on wireless devices via a thin client which can be updated at anytime.

SUMMARY

Accordingly, a need has arisen to enable applications to provide a rich user experience on wireless devices via a thin client which can be updated at anytime. The solution should allow software vendors to provide generic applications regardless of the wireless device type, thereby relieving software vendors from having to tailor their applications for each given wireless device type. Moreover, a need has arisen to not only relieve software vendors from tailoring their applications for a given wireless device type but to provide an output that is device specific based on the wireless device attributes where the output is generated from a generic application. It is advantageous to dynamically update and patch various applications without a need to access each wireless device individually after an application and device have shipped. Furthermore, a rich user experience should be provided via utilization of the capabilities of the wireless device. It will become apparent to those skilled in the art after reading the detailed description of the present invention that the embodiments of the present invention satisfy the above mentioned needs.

According to one embodiment, the present invention is implemented as a server method for facilitating execution of an application for a wireless device. The server selects a plurality of scene components, which includes at least one behavior module or functional unit operable to execute functions associated with the scene components. The server further selects a plurality of assets (e.g., images, sounds, and the like) which correspond to the scene components. The assets are operable to be used in rendering a scene utilizing the plurality of scene components. The server determines a partition of functionality of the application which defines a server behavior module for executing on the server and a client behavior module for executing on a wireless device. The server customizes the plurality of scene components and the plurality of assets for the wireless device based on the capabilities of the wireless device. The plurality of scene components and plurality of assets are sent to the wireless device for execution and rendering.

In another embodiment of the present invention, the present invention is implemented as server system operable to communicate with a wireless device. The server system includes a memory coupled to a bus and a transceiver coupled to the bus operable to communicate with the wireless device. The server system further includes a processor coupled to the bus which is operable to execute an application program which facilitates execution of an application for a wireless device. The processor also implements a functionality determiner operable to determine a partition of functionality of an application. A portion of the application is executed on the wireless device and a portion of the application is executed on the server system. The processor is further operable to implement a device profile library operable to store a device profile describing the capabilities of the wireless device. The partition defines a portion of the application executing on the server and a portion of the application executing on the wireless device. Additionally, the processor implements a scene generator operable to generate a plurality of scene components wherein the scene components comprise at least one functional unit operable to execute functions associated with the scene components. The functions of the functional units are a portion of an application operable to be executed by the wireless device and operable to generate a plurality of customized assets which are operable to be used in rendering a scene utilizing said plurality of screen components.

In this manner, embodiments of the present invention utilize the processing and other capabilities of the wireless device along with server capabilities to provide a rich user experience. More specifically, embodiments of the present invention execute a portion of the requested application on the wireless device. Thus, embodiments of the present invention tailor the application to make the application as responsive and interactive as possible and thereby provide a rich user experience.

Embodiments further relieve software vendors from tailoring their applications based on each wireless device type because the server tailors the output of a generic application based on the wireless device's capabilities. Providing software updates and patches for a generic application can be done by patching/updating the generic application on the server, thereby eliminating the need to update/patch each application on each wireless device.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternative, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "initiating" or "receiving" or "analyzing" or "generating" or "constructing" or "outputting" or "collecting" or "monitoring" or "outputting" or "storing" or "sending" or "receiving" or "identifying" or "using" or "rendering" or "translating" or "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

The increase in the number of wireless devices has led to an increase in demand for different applications. However, each given application needs to be tailored to a given wireless device type based on the wireless device capability. Embodiments of the present invention relieve software vendors from tailoring their applications based on each wireless device type because the server tailors the output of a generic application based on the wireless device capability. Embodiments of the present invention provide software updates and patches for a generic application can be done by patching/updating the generic application on the server, thereby eliminating the need to update/patch each application on each wireless device. Moreover, embodiments of the present invention partition functionality between the wireless device and server according to capabilities of the wireless device. Thus, embodiments of the present invention provide a rich user experience by utilizing the capabilities of the wireless device in conjunction with the servers capabilities.

Figure 1:
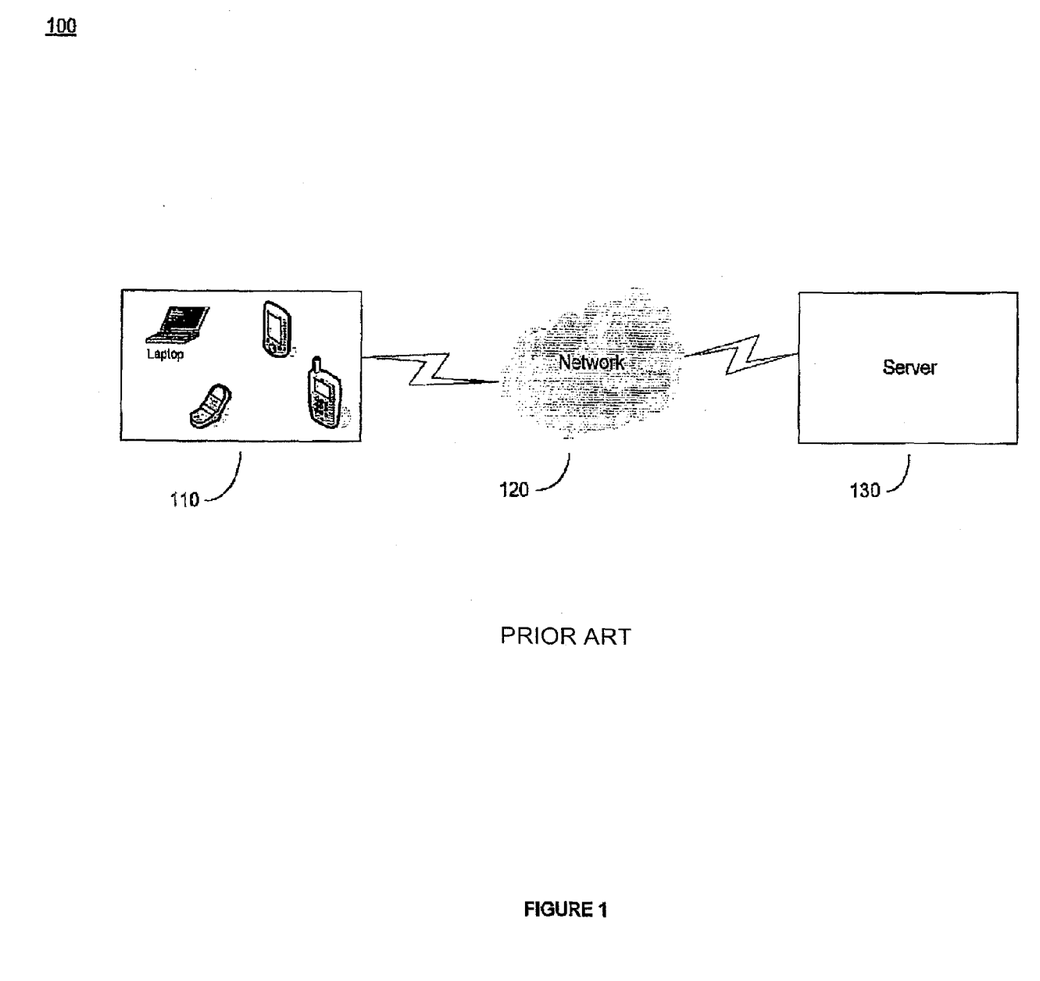
FIG. 1 shows an exemplary communication system in accordance with one embodiment of the present invention including wireless clients and a remote server.

Referring now to FIG. 1, an exemplary communication system 100A in accordance with one embodiment of the present invention including wireless clients and a remote server is shown. In one embodiment, one or more wireless devices 110 are coupled to a server 130 through a network 120. The wireless device 110 may be a mobile wireless electronic device, e.g., a cellular phone, a personal digital assistant (PDA), a pager, a smart phone, a BlackBerry, a laptop and the like. It is appreciated that the wireless device described herein is exemplary and is not intended to limit the scope of the present invention. Network 120 includes wireless communication capability.

An application may include numerous modules or components including, but not limited to, a game or application engine, user interface, artificial intelligence, key control, screen control, graphics, and sounds. The game or application engine controls the flow of the application or games, tracks scores, maintains the rules and the like. The user interface (UI) provides the menus and control scheme by which the user interacts with the application. The artificial intelligence provides application or game intelligence which the user plays against (e.g., opponents) or make suggestions. Key control facilitates reading and interpreting of key presses. Screen control facilitates the drawing the screen or scene and updating on instructions from the game engine and UI. Graphics are the assets in an application (e.g., images, animations, and the like). Sounds are the audio assets in an application.

According to an embodiment of the present invention, the remote server executes a generic application. It is generic in that it is not specific to a particular device or a particular set of device capabilities (e.g., via a hardware abstraction layer (HAL)). A scene may be a screen which includes customized layout and interface along with functional units for executing a portion of application functionality locally on wireless device 110. The server translates or customizes the output of the application to a device specific scene including a set of scene components and assets to be transmitted to device 110 for display and execution by a generic engine on device 110. Scene components can include layout information, user interface information, functional units, and the like. The server customizes the scene components and assets according to a device profile. Server 130 further customizes graphics (e.g., scales down), layout, and other scene components accordingly for device 110.

Correspondingly, the functional units (e.g., objects or state machines) can be adapted or customized based on the wireless device capabilities (e.g., FPS). The functionality of an application may be partitioned by server 130 upon the launch of an application based on the device profile which is identified by information transmitted by device 110 upon requesting the specified application. For example, if a wireless device does not support a sound format (e.g., MP3) an object or state machine may be customized to remove sound functions.

The functional units allow the processing power and other capabilities of wireless device to be used for providing real time functionality. For example, the processing and graphics capabilities of a wireless device may be used to scroll a multiplayer poker table which occupies more than one screen smoothly without requiring or waiting for communication with a server.

Depending on the capabilities, a substantial portion of functionality may be executed by the wireless device. For example, where the wireless device is relatively powerful relative to the application complexity, the scene components can facilitate the execution of substantial portions of an application locally on the wireless device such as artificial intelligence and a behavior engine.

Multiplayer or community gaming (e.g., via carrier communities) is easily supported because the server (or another server) can provide a central location for coordination of the actions of various users. For example, users can play poker in real-time against opponents anywhere in the world while having a rich user experience.

Additional application features may also be accessible via the resources of server 130. For example, a poker application may allow users to play previous poker hands or watch other players in real-time.

In one embodiment of the present invention, the client device runs a generic engine which supports the receiving of a plurality of scene components of a scene including functional units, user layout, user interlaces, and the like. The generic engine provides a uniform set of interfaces (e.g., hardware abstraction layer) to facilitate porting to a large number of client devices. The scene components and assets are displayed, rendered, and executed via the generic engine or client application executing on the wireless device. For example, the generic engine may thus display graphics, animate the graphics, handle user input, and execute local functionality.

The functional units executed by the generic engine allow the wireless device to locally handle user interface (e.g., enabling and disabling objects), keyboard and screen handling, and other application functionality. For example, device 110 can display menus and execute local artificial intelligence components with a capable client 110 for a practice round of a poker game while using minimal communication with the server. The execution of application functionality on the wireless device thus reduces the amount server communication that would otherwise be needed for an application run completely or largely on the server.

This generic engine can be installed or downloaded to the client and further allows the user interface to be tailored in numerous ways. The generic engine does not necessarily load predefined behavior and associated libraries and thereby allows a high, level of customization. For example, in a calendar application, the calendar components can be custom designed so as to not limit the application design (e.g., custom interlace controls, custom buttons, custom menus and the like). Further, because the generic engine does not load behavior and other resources, the client to occupy little storage space.

In an exemplary embodiment, when a generic application engine is launched and a poker application is selected by a client, the server will provide the graphics, layout, and small menu bar. The server will trigger the display of scenes, including updates of the scenes when other players have made moves. The triggering of an update of the scene may occur via asynchronous communication (e.g., push mechanism). For example, when it becomes a user's turn the server may initiate a popup window for the user to enter their play.

Embodiments of the present invention facilitate rich user experience by utilizing a minimal generic client application (e.g., including user interface, keyboard handling, and screen handling) and upon connecting to a server when an application starts accessing applications (e.g., including game engine, artificial intelligence, graphics, sounds, and menus) via the wireless device. Embodiments are able to provide a rich user experience by taking advantage of the processing capabilities of both the wireless device and server.

Embodiments of the present invention facilitate feature rich games and ever fresh games. Embodiments facilitate data or applications to be updated without redownloading the client application. For example, the client application may be installed by a service provider or wireless device vendor and a user will be able to access a frequently updated and expanding library of applications. Advantageously, applications can be shipped later while using the same client initially shipped. Additionally, applications can be updated or patched easily by patching the server only. As applications and games are stored and manipulated or updated on the server, they can be updated on the client whenever the generic client connects to the server.

Applications further have the capacity to easily integrate live content. For example, a poker application has access to real time poker player information and tournament information. Fresh applications are facilitated because server side assets can be updated without further downloads to the clients and thus applications can be updated after the application is live.

Further, embodiments of the present invention do not suffer from download and other device limits (e.g., java application (JAR) download limits) because the functionality is downloaded on the fly to the wireless device and not in one unique JAR download.

Embodiments of the present invention have development advantages. Applications can be designed in a generic format or manner and thereby resulting in reduced development time. Application development is accelerated because of additional applications can be created for a variety of devices while the client remains the same. Faster porting and certification is also facilitated because the core application does not change across games and core game logic is same across wireless devices.

Figure 2:
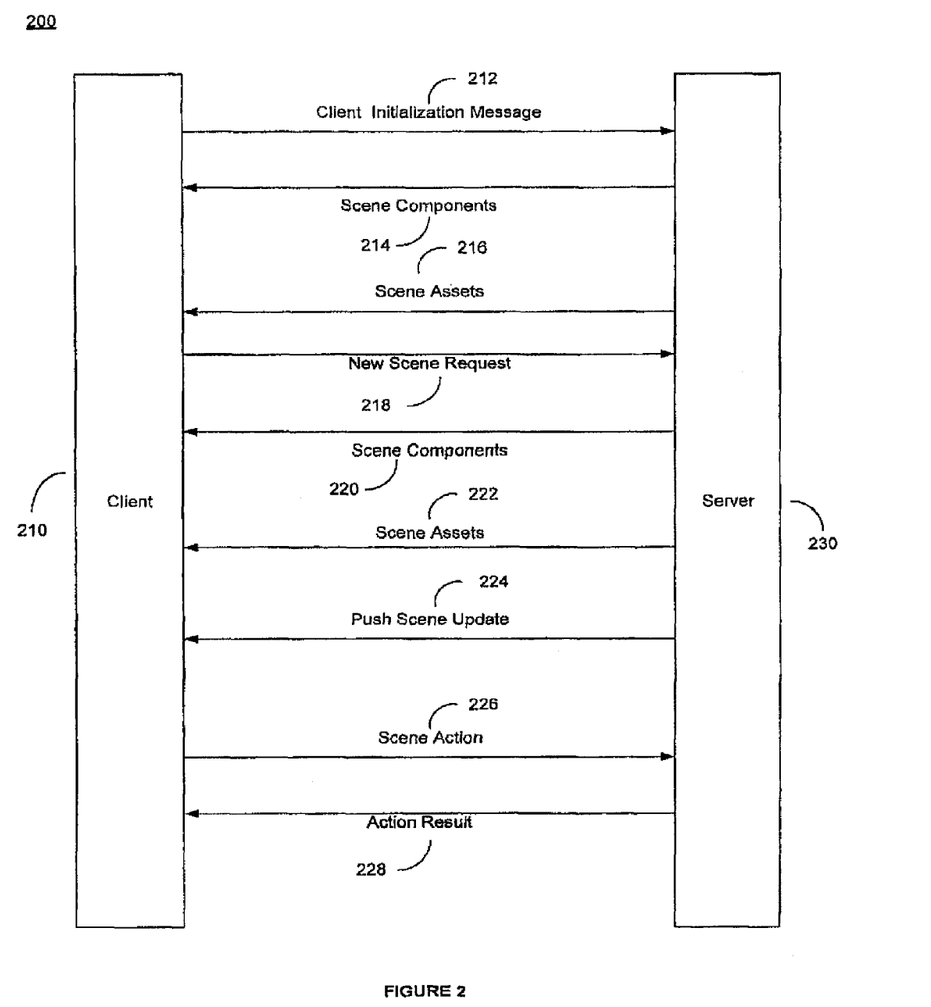
FIG. 2 shows an exemplary communication sequence between a wireless device and a remote server in accordance with one embodiment of the present invention.

Referring now to FIG. 2, an exemplary communication sequence 200 between a wireless device 210 and a remote server 230 in accordance with one embodiment of the present invention is shown. At step 212 the client 210 via a client engine sends an initialization message to the server 230 identifying the wireless device type and its capabilities along with a request to initiate an application on the server. It is appreciated that the application is generic and independent of the wireless device type. For example, server 230 receives a client initialization message from client 210 to initialize a poker application.

At step 214, server 230 notifies the client of the start of a scene or screen and sends a plurality of scene components. The scene components are customized by server 230 for the client 210. A scene is composed of a set of layers which includes objects or assets and associated behavior or functionality. For example, object size, layout, position and other scene components are mapped for the target device. Additionally, the scene components include behavior modules or functional units (e.g., objects or state machines) which include functionality (e.g., menus and handling of graphics object focus) to be executed on client 210. The functional unit variables can be customized depending on the targeted devices specifications (e.g., frames per second (FPS), width/height, etc.). In one exemplary embodiment, the scene components are in a binary and for XML format.

In one exemplary embodiment, the functional unit is a state machine which includes a plurality of states, with each state containing an enter action, exit action, and a transition action. The functionality may be carried out or stored as a state machine whereby actions are triggered on the entry and exit of a state. An enter action is executed when the state is entered from another state. The exit action is executed when the state is left to another state. The transition action between states is optionally executed if a condition is true or not defined. A transition can result in the same state (e.g., loop back on the current state). The state transitions can have an event trigger and optional condition which triggers an optional action. For example, an event may be a keyboard button press. It is appreciated that a functional unit may be any event driven engine (e.g., programming or software object) with state machine capacity or similar behavior.

For example, the functional units may control a splash screen animation and present a login prompt for a poker application. The animation scheme or pattern may be adapted for lower power or limited capability wireless device such that graphics may jump or frames be dropped according to abilities of the wireless device. Similarly, more powerful wireless devices may have scene components adapted such that smooth animation occurs. Such settings such as the animation pattern may be determined by the server and set via the scene components.

At step 216, server 230 notifies the client of missing assets and sends a plurality of scene assets. Assets may be a variety of resources related to the scene including but not limited to, menus, graphics, images, fonts, icons, cursors, animations, and sounds. It is appreciated the sending the plurality of assets may comprise multiple communications (e.g., multiple images being sent). The client application on client 210 displays or presents a graphical user interface using the plurality of assets and is operable to generate an interactive interface based on the scene components and functional units to facilitate interaction with the application. The client application may further include an engine for rendering the assets and is responsive thereto for causing the graphical user interface to display the assets and execute the functional units.

It is appreciated that steps 214 and 216 are shown as separate communications; however, separate communications for scene components and assets are exemplary and should not be construed as limiting the scope of the present invention. Accordingly, the scene components and assets may be downloaded simultaneously. Moreover, it is appreciated that additional information (e.g., loading animations) may be downloaded separately or simultaneously with the scene components and assets. It is appreciated that the client 210 may optionally send an acknowledgement message to the server 230 indicating successful receipt of the scene components and assets. Further, it is appreciated that client 210 may cache (e.g., via Least Recently Used (LRU) method) scene components and assets so as to facilitate faster application performance and reduce bandwidth consumption.

Network connections may further be provisioned, dropped, and reestablished dynamically. For example, a network connection to server 230 may be dropped by a client after a response from server 230 has been received and the connection reestablished upon a user action (e.g., the selection of a menu item). Communications may further be dropped by a server after a period of inactivity (e.g., sixty seconds etc.) to conserve server resources.

At step 218, client 210 requests a new scene. In one exemplary embodiment, client 210 executes the functionality associated with the scene and receives input and requests a new scene to provide the next scene in the application. For example, client 210 receives input completing a login screen of a poker application and the request is initiated for the next scene upon selecting the "submit" button to submit the completed form.

In another embodiment, client 210 may request a new scene from a different application. Server 230 may provide an application state storage operable for storing a plurality of application data to facilitate the execution of another application to be resumed at a later time. For example, a user may be playing a poker game and then launch a connect4 or blackjack game, which will launch dynamically and the server saves the information associated with the poker game.

At step 220, server 230 sends scene components to client 210. In one exemplary embodiment, some scenes may be available throughout the scenes, these scenes are called system scenes and have specific objects to get information on the client device. For example, a system scene in an application could be a dialog box invite or a loading animation scene which are used across the application.

At step 222, server 230 sends scene assets to client 210. In one exemplary embodiment, the assets are part of a system scene. For example, the assets may be images associated with a system scene of a poker table, of a poker application including the table, cards, players, and icon graphics. The assets can further include sounds and animations.

At step 224, a push scene update is initiated by server 230. Pushed scene updates may be asynchronous messages that are sent by the server without user interaction that are triggered by a specific event on the server side. For example, if player has just joined a poker game and a move is made by an opponent (e.g., human or computer opponent), server 130 may initiate a push scene update to update the scene. The scene update may include an animation corresponding to the activity of the other players.

At step 226, client 210 sends a scene action to sever 230. A scene action is a request to process for the current state of the scene and includes object parameters linked to facilitate updating the server representation of the application. In one exemplary embodiment, inside a scene an object or a state machine can initiate the sending of a scene action message to the server. In another embodiment, scene variables are local to the scene and not shared from one scene to another. For example, an action may be sent upon a move of a poker application user such as raising a bet, folding, etc.

At step 228, server 230 sends an action result. After receiving user input from a user an animation may run while the server is contacted for the action result. In one exemplary embodiment, the action result comprises an event trigger to be handled by the client application engine executing the functional unit. Client 130 may also receive updated functional unit (e.g., object or state machine) parameters to update the functional units. It is appreciated that the response to an action may result in multiple communications. For example, a move by a poker application user may result in the action results as the other players take their turns.

Figure 3:
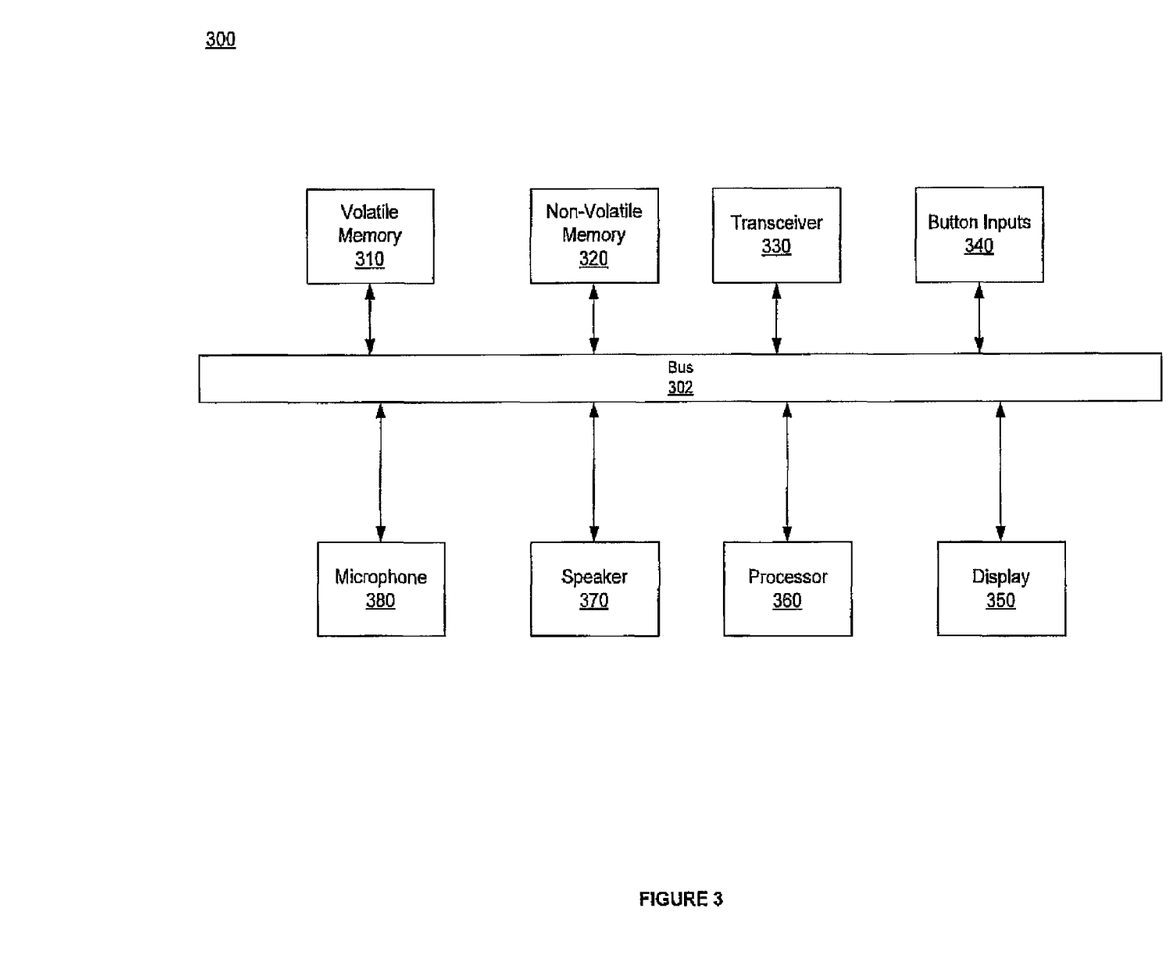
FIG. 3 shows an exemplary wireless device block diagram in accordance with one embodiment of the present invention.

Referring now to FIG. 3, an exemplary wireless device block diagram 300 in accordance with one embodiment of the present invention is shown. The wireless device 300 may implement the process for facilitating communication and execution of an application between the wireless device and the server as shown in FIGS. 1-2 and includes a bus 302 or other communication mechanism for communicating information, and a processor 360 coupled with bus 302 for processing information.

Wireless device 300 also includes a volatile memory 310, such as a random access memory (RAM) or other dynamic storage device, coupled to bus 302 for storing information and instructions to be executed by processor 360. Volatile memory 310 also may be used for storing temporary variables or other intermediate information during execution of instructions to be executed by processor 360.

Wireless device 300 further includes a non-volatile memory 320 such as read only memory (ROM) or other static storage device coupled to bus 302 for storing static information and instructions for processor 360. A non-volatile storage device 320, such as a magnetic disk or flash memory, is provided and coupled to bus 302 for storing information, instructions, scene components, and assets. According to one embodiment, the instructions for implementing the virtual device may be stored on one of the memory components (e.g., RAM, ROM, non-volatile storage device and etc.). Wireless device 300 may be coupled via bus 302 to a display 350, such as liquid crystal display (LCD), for displaying information on the wireless device.

The term "computer-readable medium" as used herein refers to a medium that participates in providing instructions to processor 360 for execution. Such a medium may take many forms, including but not limited to, non-volatile media, volatile media, and transmission media. Non-volatile media includes, for example, optical or magnetic disks or the like. Volatile media includes dynamic memory and the like.

The wireless device 300 further includes a transceiver 330 for facilitating wireless communication with a remote server. The transceiver 330 may receive scene components and assets associated with an application which are used to render the application and/or content on display 350.

In one embodiment, the wireless device 300 further includes button inputs 340 e.g., a keyboard, for facilitating user interaction. For example, button inputs 340 may be used to navigate a website, enter email addresses, enter telephone numbers, poker game plays, and the like. It is appreciated that button inputs 340 may be soft key buttons, a plurality of mechanical buttons, a rotating input component, a sliding input component, a voice activation component and the like.

The wireless device 300 may further include a microphone 380 for facilitating voice and audio input. The wireless device 300 may also include a speaker 370 for outputting audio. For example, the speaker 370 may be used to output a sound file such as mp3 or output voice outputs.

Figure 4:
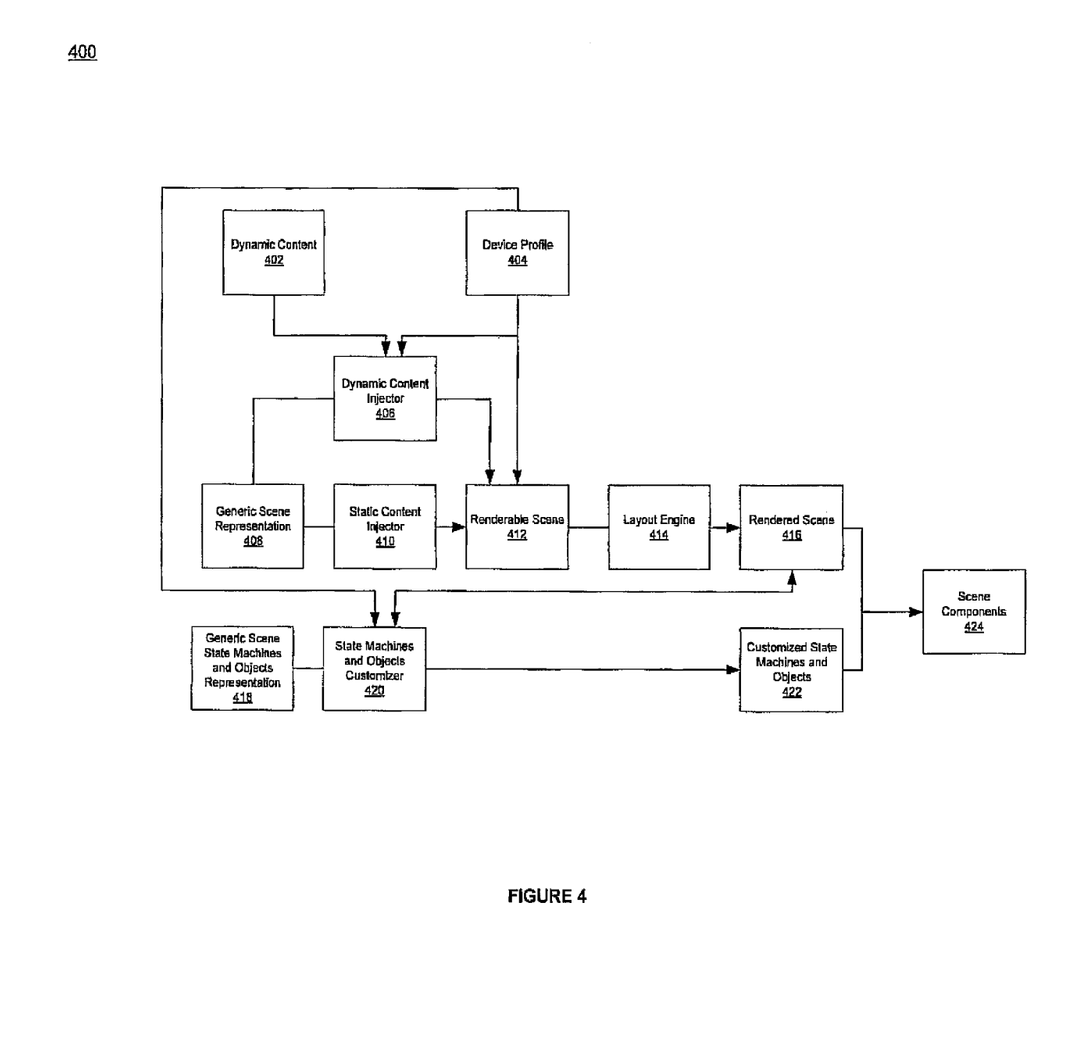
FIG. 4 shows an exemplary scene generation flow diagram in accordance with one embodiment of the present invention.

Referring now to FIG. 4, an exemplary scene generation flow diagram 400 in accordance with one embodiment of the present invention is shown. The resulting generated scene is sent to the client (e.g., client 210) by the server (e.g., server 230). The scene is customized to utilize the processing capabilities of client device (e.g., wireless device) in conjunction with the server's capabilities to provide a rich user experience. In one embodiment, the scene generation process is performed by a scene generator operable to generate a plurality of scene components which include at least one functional unit operable to execute functions associated with the scene components. The functions of the functional units are a portion of an application operable to be executed by a wireless device. The scene generator is further operable to generate a plurality of assets which are operable to be used in rendering a scene utilizing the plurality of screen components.

Device profile 404 includes information on device capabilities. In one exemplary embodiment, device profile 404 is implemented as a device profile library (e.g., database) operable to store device profiles describing the capabilities of wireless devices. The server 230 determines the client's 210 capabilities by accessing a library of device profiles and based on the received message from the client 210 identifying itself (e.g., brand, model, memory size and the like).

In one embodiment, the wireless device type and its capabilities may include the brand, the model, the wireless service provider, and the version number and may include some device capability information such as the screen size, screen resolution, the amount of memory, permanent storage capabilities, the color resolution, the image format, the list of Java specification request (JSR) such as video, global positioning system (GPS) capabilities, access to address book, capability to initiate a call, short messaging system (SMS), multimedia messaging service (MMS) and the like. It is appreciated that the list of wireless device types provided herein is exemplary and should not be construed as limiting the scope of the present invention.

Generic scene representation 408 includes a generic or device independent representation of the screens of an application including, but not limited to, plurality of layers, scene objects, and Z ordering information, menus, soft keys, and the like. The generic scene representation is based on the generic application (e.g., poker game). For example, a developer may develop a generic scene representation of a poker table for a multiplayer poker application which includes a poker table, player positions, pot size, odds, and each player's hand.

In one exemplary embodiment, generic scene representation 408 is made up of custom scene components, which can be developer customized. For example, a developer may develop custom scene component library for displaying custom input dialogue boxes or objects.

Dynamic content injector 406 uses dynamic content 402 and device profile 404 to inject or integrate dynamic content into generic scene representation 408 to generate renderable scene 412. Dynamic content 402 may include, but is not limited to, Really Simple Syndication (RSS) feeds, sports scores, financial data (e.g., stock prices, account balances), game opponent data (e.g., moves in a poker game) and databases. In one embodiment, dynamic content is accessed from a database which may be stored locally on a server (e.g., server 230) or a remote server.

Static content injector 410 injects static content into generic scene representation 408 to generate renderable scene 412. For example, static injector 410 may inject pictures or pure text into generic scene representation 408.

Layout engine 414 uses renderable scene 412 along with device profile 404 to generate rendered scene 416. The generated rendered scene 416 is customized by a server (e.g., server 210) based on the capabilities of the client device (e.g., client 230). For example, the server can adapt the layout according to the wireless device so that graphics can be scaled down and positioned (e.g., centered) or clipped for display on the small screen of a cellular telephone. Rendered scene 416 may further include drawing commands customized for a client device.

In one embodiment, the screen of the wireless device is referenced in an XY format with X=0 and Y=0 at the top left. Graphics objects can have a z ordering so that objects can be rendered in the right order (e.g., objects in front of others). Each graphic object may be defined by an anchor position and a width height bounding box. The anchor point of the object is the top left corner of the bounding box.

State machines and objects customizer 420 uses device profile 404, rendered scene 416, and generic scene state machines and objects representation 418 to generate customized state machines and objects 422. The generic scene state machines and objects representation is customized for the target device using device/scene parameters (e.g., objects, screen widths, FPS, and the like). Generic scene state machines and objects representation 418 is further customized to partition functionality between the server and the client such that a portion of an application is executed on client and a portion of the application is executed on the server. In one embodiment, a functionality determiner determines a partition of functionality of an application which defines a portion of the application to execute on the client device and a portion to execute on the server.

Developers may thus write generic state machines or objects for the functionality of an application and the corresponding layout (e.g., in XML) to represent the various scenes that make up the application. A generic state machines or objects and corresponding scene representations may be designed via a software development kit application which allows developers to access device profiles and visually see the scene representations and objects and state machines (e.g., in a flow chart format). Further, an application programming interface (API) can be provided so developers can easily integrate multiplayer functionality into applications to notify the server of user activity.

It is appreciated that generic scene state machines and objects representation 418 may be customized to eliminate content and functionality from customized state machines and objects 422 that is not supported by the client. For example, if the application includes an audio component but the client does not have audio capability, then the state machines and objects customizer 420 may eliminate an audio component from customized state machines and objects 422. In another example, when the client is short on memory, state machines and objects customizer 420 may eliminate functionality from customized state machines and objects 422 corresponding to large images.

Scene components 424 including rendered scene 416 and customized state machines and objects 422 are sent to the client to facilitate the execution of the selected application. For example, plurality of scene components may be customized to adapt the animation pattern of said wireless device. In one embodiment, the scene components are in a precompiled binary format to facilitate quick execution of the application on the client device.

Different blocks have been described as separate units. However, it is appreciated that each functional block described herein may be integrated as a single working unit. As such, depiction of functional blocks as separate units is exemplary and should not be construed as limiting the scope of the present invention.

Figure 5:
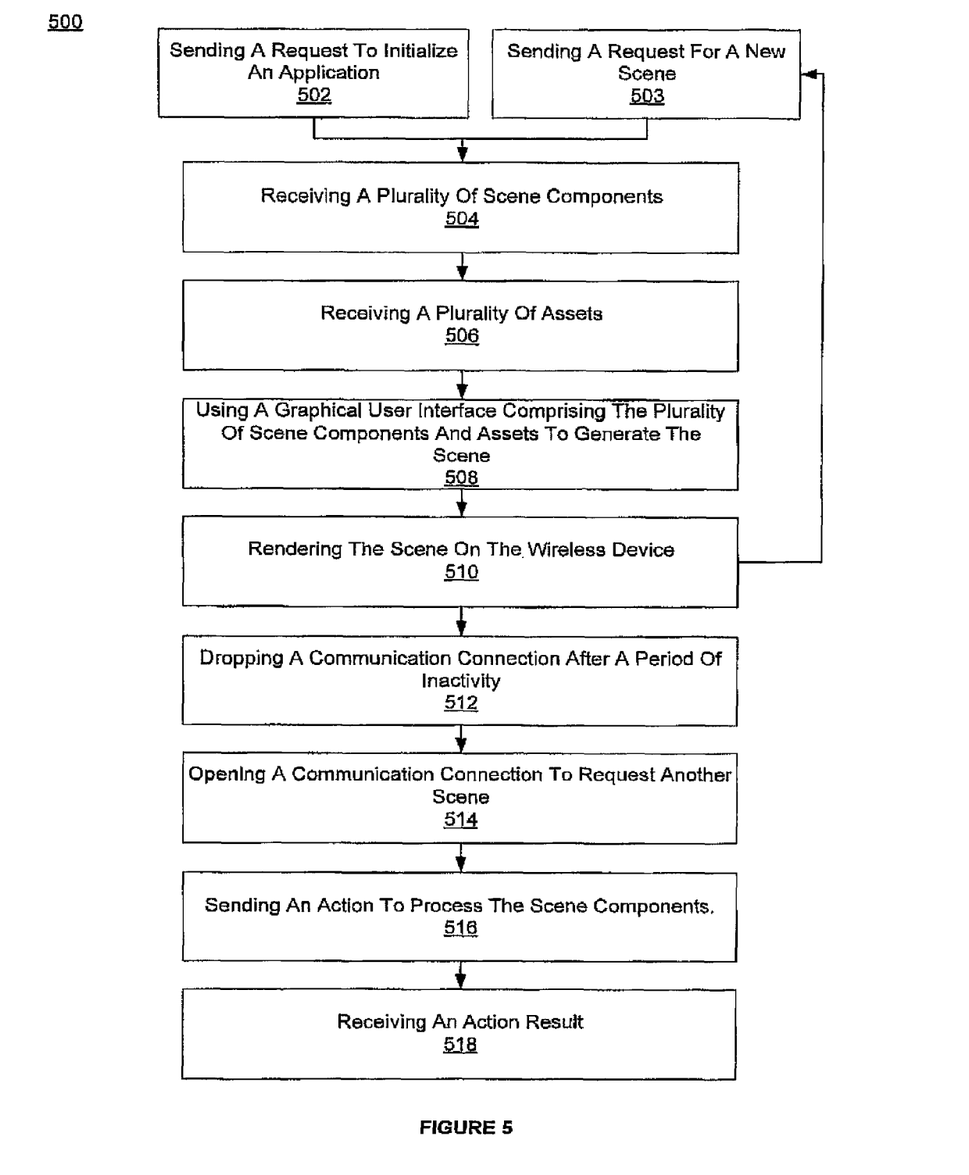
FIG. 5 shows an exemplary computer controlled flow diagram for application execution on a wireless device in accordance with one embodiment of the present invention.

Referring now to FIG. 5, an exemplary computer controlled flow diagram 500 for executing an application on a wireless device in accordance with one embodiment of the present invention is shown. The blocks of flowchart 500 may be carried out by a client (e.g., client 210) in communication with a server (e.g., server 230).

At block 502, a request is sent to initialize an application. In one embodiment, a generic client application executes on a wireless device. The request to initialize the server application may further include information to identify the client device (e.g., the device's capabilities). For example, a wireless device may send a message to a remote server requesting an application as well as identifying itself and its capability (e.g., screen size, screen resolution and the like).

At block 503, a request for a new scene is requested. After the functionality of a scene has completed executing, the client device may request the next scene. For example, after the client has displayed a splash screen, the client may request the next scene of a poker application to display a poker game user interface.

At block 504, a plurality of scene components are received. The plurality of scene components are associated with an application and include at least one behavior module or functional unit operable to execute functionality or functions associated with the scene components. The functions are a portion of an application to be executed by the client. In one embodiment, the functional unit is a state machine which performs state machine transitions to carry out functionality associated with the scene components (e.g., moving sprites across the display of a device in response to command received from a server). The functional unit may further be precompiled in a binary format. The other scene components may include layout information, layers, and include a plurality of screen drawing commands (e.g., objects such as boxes, shapes, and the like).

At block 506, a plurality of assets (e.g., graphics, icons, menus, sounds, and like) is received. The assets are operable to be used in rendering a scene in conjunction with the plurality of scene components. The assets are further customized for rendering on a client device. For example, the assets may be graphics scaled down for display on the screen of a wireless device. In one embodiment, the plurality of scene components and the plurality of assets are received asynchronously.

At block 508, a graphical user interface including the plurality of scene components and the assets is used to generate the scene. In one embodiment, the scene is generated based on the scene components and processing the functional units which are executed on the client device.

At block 510, the scene is rendered on the wireless device. The scene generated by the graphical user interface is rendered and may thereby be presented to a user to interact with the application. For example, a user interface may be presented to a user of a poker application including a poker table and various information of each opponent.

At block 512, a communication connection is dropped after a period of inactivity. For example, to conserve communication resources the client may drop the communication connection to the server while the client is executing the functional units of the application.

At block 514, a communication connection is opened to request another scene. For example, after input is received from a user, the portion of the application running on the client opens a communication connection to the server in order to contact the server to bring the user to the next scene (e.g., present the application after a login screen). It is appreciated the client may send object parameters related to the current functional unit state and other application information.

At block 516, an action is sent to process the scene components. It is appreciated that in response to rendering content, a user of the wireless device may initiate an action (e.g., by selecting an icon) that may further cause a action message to be sent to the server. For example, a client may send an action to a server to process the scene components upon a move during a turn of a poker player selecting to raise a bet.

At block 518, an action result is received. The server in response to a user interaction may compile additional scene content and send the additional compiled scene content to the wireless device. The action result may trigger an event of a function unit on the client. For example, the server may update the scene components or state of the application running on the client to reflect the turns of other players in a multiplayer poker application. It is further appreciated that the server may automatically and without initiation of an action by the user push additional content (e.g., updated compiled content) to the wireless device.

Figure 6:
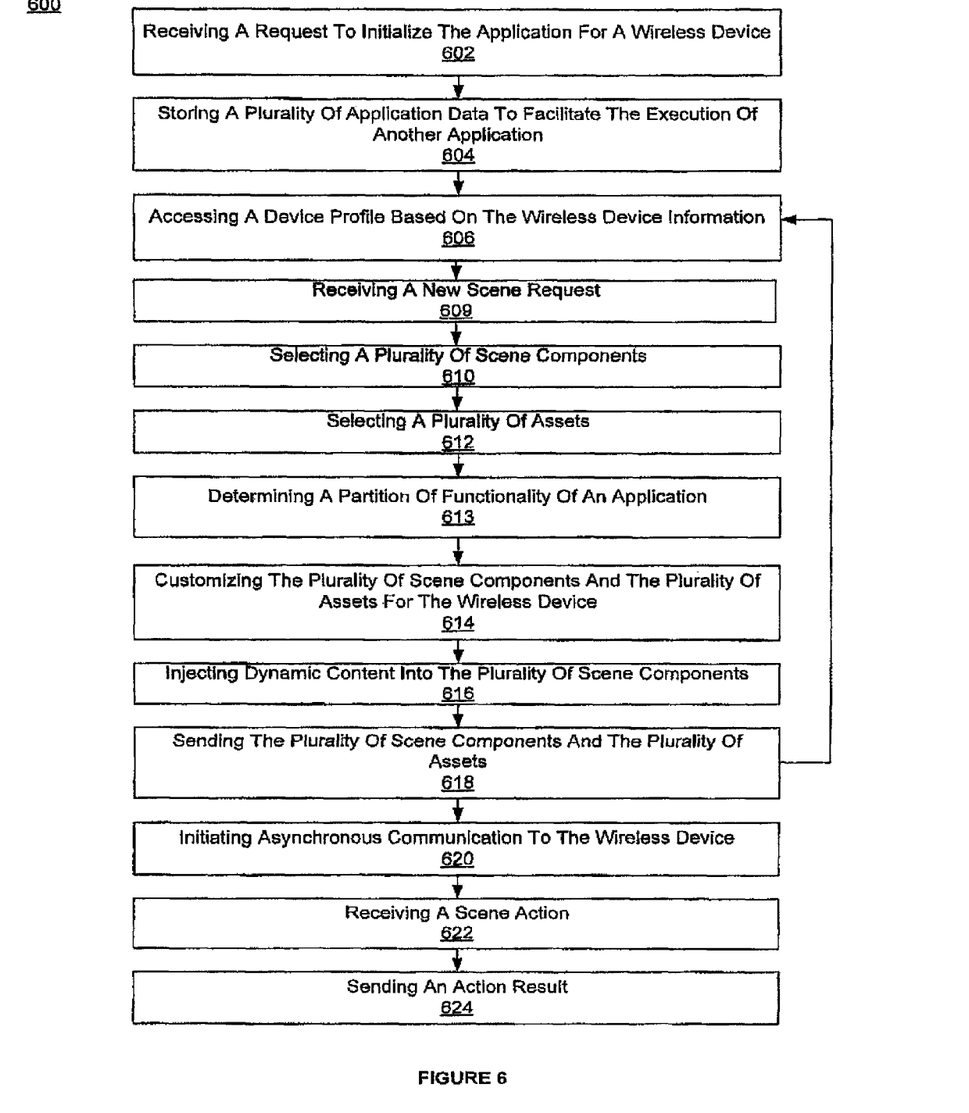
FIG. 6 shows an exemplary computer controlled flow diagram of a server implemented method for facilitating application execution on a wireless device in accordance with one embodiment of the present invention.

Referring now to FIG. 6, an exemplary computer controlled flow diagram 600 of a server implemented method for executing an application for a wireless device in accordance with one embodiment of the present invention is shown.

At block 602, a request is received to initialize the application for a wireless device. The request includes the application to be initialized and wireless device information as described herein. The wireless device information is used to access a device profile library to customize the application to be executed on the wireless device.

At block 604, a plurality of application data is stored to facilitate the execution of another application. The application data facilitates the resuming of an application at a later time. For example, a user may be playing a single player blackjack application and decide to play a poker game. The server will store the data necessary to allow the user to return to the blackjack application in the same state at a later time.

At block 606, a device profile is accessed based on the wireless device information. As described herein the device profile contains a plurality of device attributes which can be used to customize the application for partial execution on the client device.

At block 608, a new scene request is received. The new scene request may be received from a client that has completed displaying and executing the current scene and is requesting a new scene in order to display the next scene of the application. For example, a new scene may be requested as the client is finishing animation of a splash screen.

At block 610, a plurality of scene components are selected. The scene components include at least one functional unit operable to execute functions associated with the scene components making up the scene or screen. The functions of the functional units are a portion of the application operable to be executed by said wireless device. In one embodiment, the scene components are in an XML format.

At block 612, a plurality of assets are selected. The assets are operable to be used in rendering a scene utilizing the plurality of screen components. In one embodiment, the assets comprise graphics and sounds customized for a wireless device.

At block 613, a partition of functionality of an application is determined. The partition defines a server behavior module or portion of the application which executes on the server and a client behavior module or portion of the application executing on the wireless device. The rich functionality and/or more complex behavior may be partitioned off into the server-side behavior module. The server side behavior module can use the more power resources of the server (e.g., CPU, memory, etc.) to power complex and visually pleasing user interactivity features. The server behavior module may perform complex decision-making and game logic. For example, the artificial intelligence for robot opponents may be executed by the server behavior module.

The server behavior module can maintain information on the partition of responsibilities between the server behavior module and the client behavior module. This allows an object or state machine of the server behavior module to drive the object or the state machine of the client behavior module.

In one embodiment, the partition of functionality may be determined based on the wireless device profile. For example, a relatively low power client device may result in a partition that places minimal portion of application functionality for execution on the client device, such as menus. The server behavior module may further dynamically partition the application functionality to allocate more functionality to more capable client devices and less functionality to less capable client devices.

At block 614, the plurality of scene components and the plurality of assets are customized for the wireless device. The customization of the scene components and assets is based on the partition of functionality of the application and the wireless device profile and thus allows the display and execution of an application on a wireless device while allowing a rich user experience. For example, the plurality of scene components are customized to adapt the layout and animation pattern for a wireless device.

At block 616, dynamic content is injected into the plurality of scene components. In one embodiment, dynamic content (e.g., news feeds, RSS, and the like) are injected into a generic set of scene components to integrate the content for customization for the client device. In another embodiment, static content injected into the plurality of scene components.

At block 618, the plurality of scene components and the plurality of assets are sent. The plurality of scene components and assets allow the execution of the client portion of the application. In one embodiment, the functional units of the scene components are in a binary format to facilitate quick execution of the scene on the client device.

At block 620, asynchronous communication to the wireless device is initiated. The server may update the scene components or assets of a scene or trigger an event without a request from a client to bring the client up to date. For example, the server may send the client updates to allow the client to display the moves of opponents in a poker application.

At block 622, an action to process scene components is received. The action from a client may include object parameters to update the server representation and result from user interaction. For example, in a poker application the move of a user may require the updating of the application representation to provide opponents with information.

At block 624, an action result is sent. In one exemplary embodiment, the action result triggers an event to be handled by the client state machines or objects. The action result may further include updated object parameters to update the client representation (e.g., object or state machine). For example, in response to the move of a player the server may send an action result including the moves of the opponents in a poker application.

Accordingly, applications are customized to take advantage of the capabilities of the client device to facilitate a rich user experience. Further, applications can be developed in a generic manner regardless of the device type. Developing generic applications regardless of the wireless device type is in part possible because the server may be used to operate on a generic application and tailor the application based on the wireless device's capabilities. As a result, software vendors are relieved from tailoring their application to each wireless device. Moreover, since applications are customized by the server, providing patches and updates can be facilitated by updating the server, thereby eliminating the need to access each wireless device individually.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A server implemented method for facilitating execution of an application for a wireless device comprising:
    receiving, at the server, an indication of a capability of a wireless device;
    selecting a plurality of scene components including at least one behavior module operable to execute functionality associated with said plurality of scene components, wherein said scene components are specific to the wireless device;
    selecting a plurality of assets operable to be used in rendering a scene utilizing said plurality of scene components;
    determining, based on said indication, a partition of functionality of said application, said partition defining a server behavior module associated with a first portion of said application configured to be executed on said server and a client behavior module associated with a second portion of said application configured to be executed on said wireless device, wherein said application is not specific to a set of capabilities of said wireless device;
    dynamically customizing said plurality of scene components and said plurality of assets for the wireless device based on (i) said indication and (ii) said partition of functionality of said application;
    sending said plurality of scene components to the wireless device; and
    sending said plurality of assets to the wireless device,
    wherein said first portion is executed on said server and said second portion is executed on said wireless device.

2. The method of claim 1, wherein the receiving includes receiving a request to initialize said application for the wireless device, wherein said request includes the indication of the capability of the wireless device.

3. The method of claim 1, further comprising: initiating asynchronous communication to the wireless device.

4. The method of claim 1, further comprising:
    injecting dynamic content into said plurality of scene components.

5. The method of claim 1, wherein at least one of said scene components is in one of an Extensible Markup Language (XML) format or a compiled binary format.

6. The method of claim 1, wherein said assets include at least one graphic customized for the wireless device based on said indication.

7. The method of claim 1, wherein said plurality of scene components are customized, based on said indication, to adapt to an animation pattern of the wireless device.

8. The method of claim 1 further comprising:
    storing a plurality of application data related to the application on the server to facilitate re-execution of the application at a later time.

9. The method of claim 1 further comprising:
    storing a plurality of application data related to the application on the server to facilitate execution of a second application.

10. The method of claim 1 further comprising:
    accessing a device profile based on said indication of a capability of the wireless device.

11. The method of claim 1 wherein the partition of functionality of said application is changed during the operation of the application on the wireless device.

12. The method of claim 11 wherein the partition of functionality is changed by the server behavior module.

13. The method of claim 1 further comprising:
receiving an action to process the plurality of scene components; and
sending additional scene components to the wireless device in response to such action.

14. A non-transitory processor-readable medium storing code representing instructions to cause a processor to:
select a plurality of scene components including, at least one functional unit operable to execute a function associated with said plurality of scene components, said function of said at least one functional unit is a portion of an application operable to be executed by a wireless device;
select a plurality of assets operable to be used in rendering a scene utilizing said plurality of scene components, wherein said scene components are specific to the wireless device;
determine a partition of functionality of said application, said partition defining a first portion of said application to be executed on said server and a second portion of said application to be executed on the wireless device, wherein said application is not specific to a set of capabilities of said wireless device;
dynamically customize said plurality of scene components and said plurality of assets for the wireless device based on said partition of functionality of said application;
send said plurality of scene components to the wireless device; and
send said plurality of assets to the wireless device
wherein said first portion is executed on said server and said second portion is executed on said wireless device.

15. The code of claim 14, wherein said instructions further cause said processor to:
receive a request to initialize said application for the wireless device, said request includes wireless device information.

16. The code of claim 15, wherein said instructions further cause said processor to:
access a device profile based on the said wireless device information, wherein said device profile containing an indication of a capability of the wireless device.

17. The code of claim 14, wherein said plurality of scene components are customized by a developer of said application.

18. The code of claim 14, wherein said plurality of scene components includes a layout adapted for the wireless device.

* * * * *